(12) United States Patent
Hall et al.

(10) Patent No.: US 10,685,322 B2
(45) Date of Patent: Jun. 16, 2020

(54) SYSTEM FOR AUTOMATICALLY MONITORING A SUPPLY OF A CONSUMABLE PRODUCT, REPLENISHING THE SUPPLY, AND METHODS OF USE

(71) Applicants: David R. Hall, Provo, UT (US); Ben Swenson, Lehi, UT (US); Jared Eggett, Lehi, UT (US); Hugo Tapia, Provo, UT (US)

(72) Inventors: David R. Hall, Provo, UT (US); Ben Swenson, Lehi, UT (US); Jared Eggett, Lehi, UT (US); Hugo Tapia, Provo, UT (US)

(73) Assignee: Hall Labs LLC, Provo, UT (US)

( * ) Notice: Subject to any disclaimer, the term of this patent is extended or adjusted under 35 U.S.C. 154(b) by 204 days.

(21) Appl. No.: 15/829,557

(22) Filed: Dec. 1, 2017

(65) Prior Publication Data
US 2019/0171996 A1    Jun. 6, 2019

(51) Int. Cl.
| | |
|---|---|
| *G06F 11/30* | (2006.01) |
| *G06Q 10/08* | (2012.01) |
| *G06Q 30/06* | (2012.01) |
| *G01G 19/414* | (2006.01) |
| *G01G 17/04* | (2006.01) |
| *G01F 23/20* | (2006.01) |
| *G01F 23/00* | (2006.01) |

(52) U.S. Cl.
CPC .......... *G06Q 10/087* (2013.01); *G01G 17/04* (2013.01); *G01G 19/414* (2013.01); *G06Q 30/0633* (2013.01); *G01F 23/0007* (2013.01); *G01F 23/20* (2013.01)

(58) Field of Classification Search
CPC .................................................... G06Q 10/087
See application file for complete search history.

(56) References Cited

U.S. PATENT DOCUMENTS

| | | | |
|---|---|---|---|
| 2006/0048841 A1* | 3/2006 | Luehrsen ............ | B01F 13/1058 141/10 |
| 2014/0263426 A1* | 9/2014 | Gasper ................. | B05B 12/081 222/52 |
| 2018/0197135 A1* | 7/2018 | Moyer .................. | G06Q 50/10 |

* cited by examiner

*Primary Examiner* — Phuong Huynh

(57) ABSTRACT

The system includes an apparatus which automatically measures an inventory of a consumable good and tracks the inventory as it is used. The system may include a signaling device which creates a signal when a defined minimum amount of the consumable good has been reached. The apparatus may also send the user an electronic message that the defined minimum has been reached. The system may then automatically submit an order to a supplier for a replacement supply of the consumable good. This system may be used to track supply and reorder animal food, food staples, production supplies, manufacturing parts, or virtually any consumable good. Accordingly, a user may avoid the inconvenience and loss of time and money due to failure to timely replace a consumable good.

18 Claims, 13 Drawing Sheets

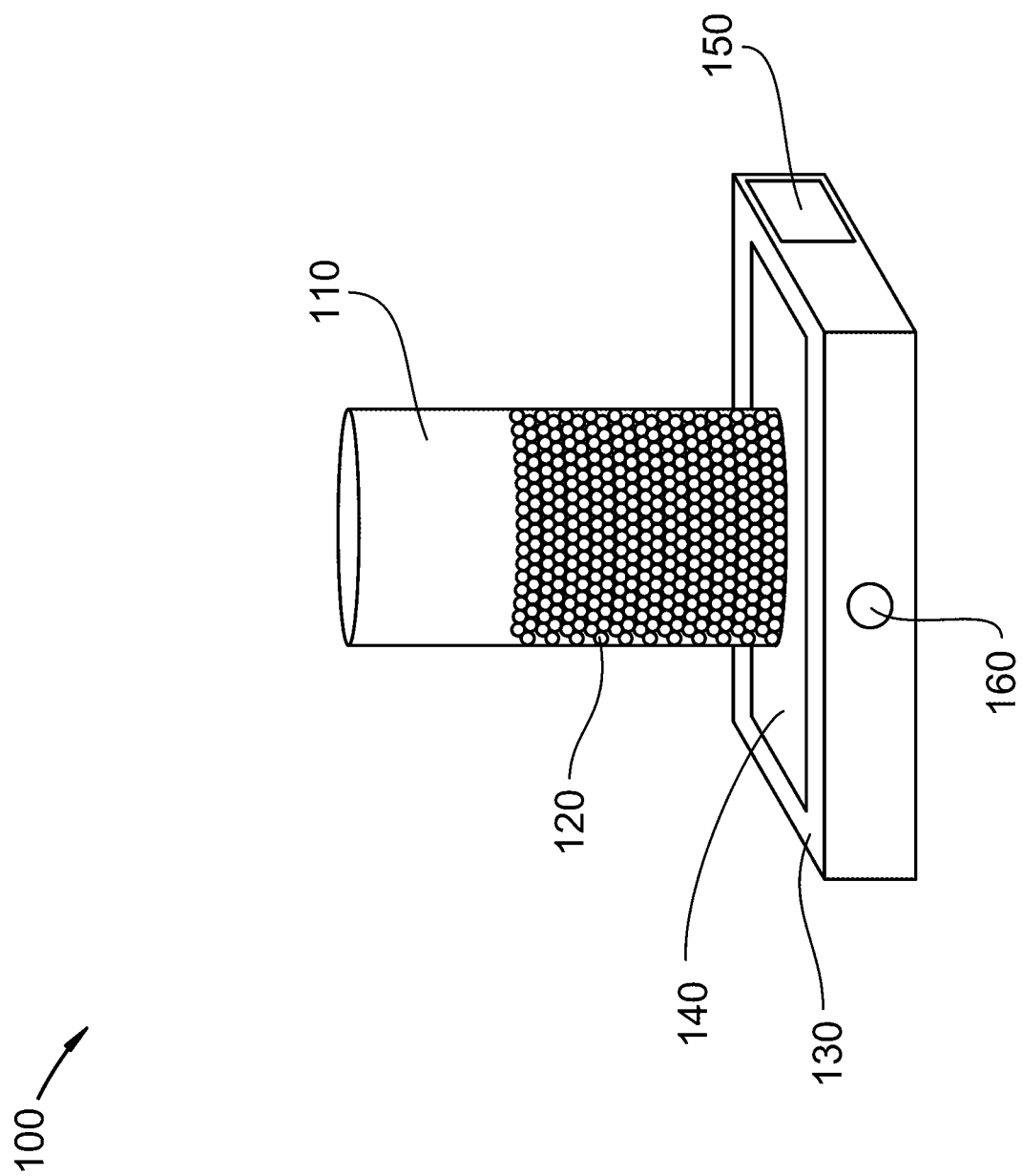

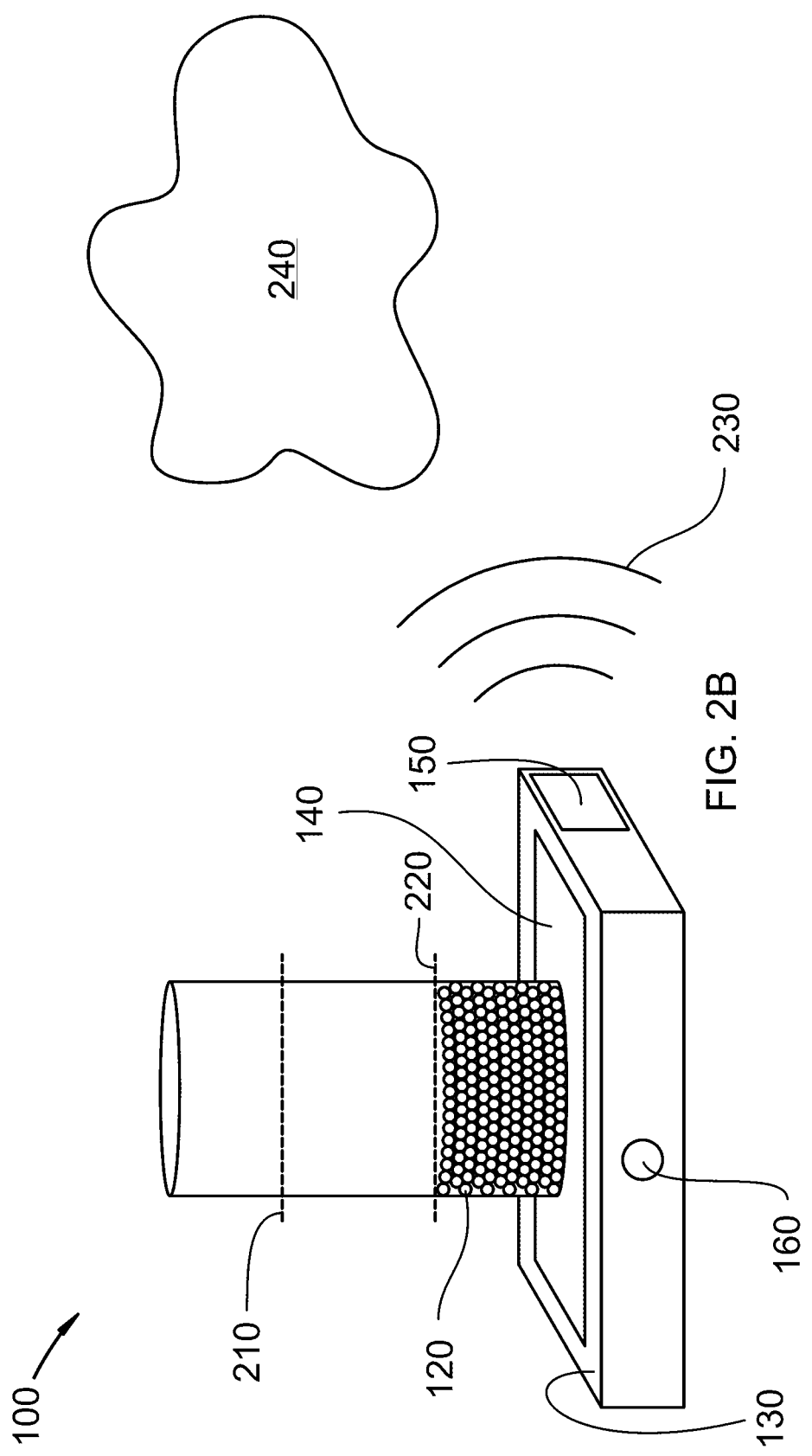

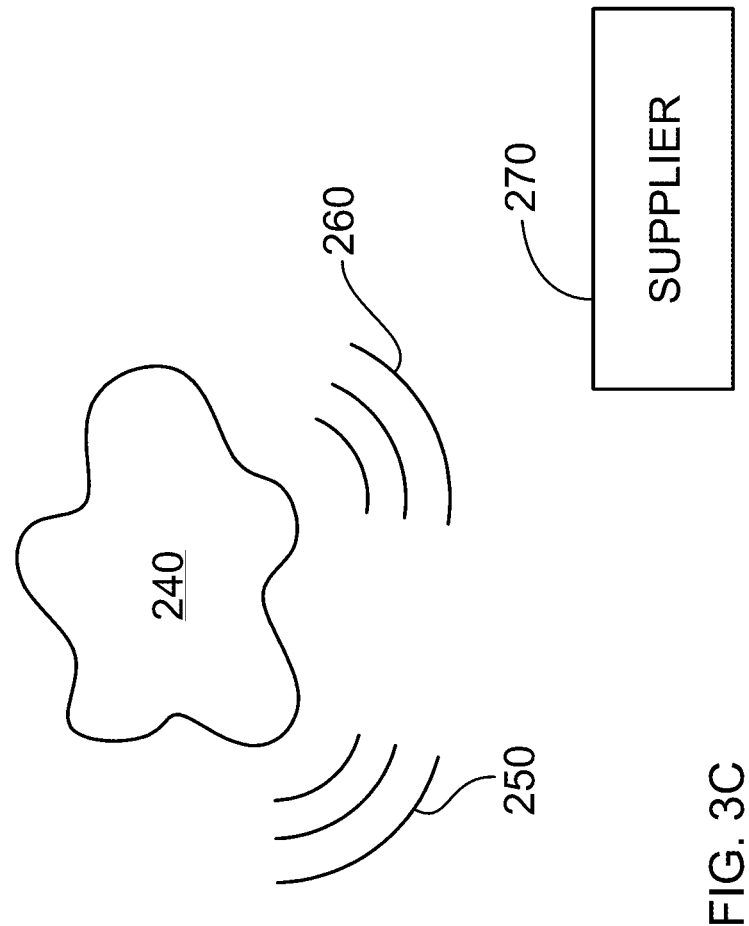
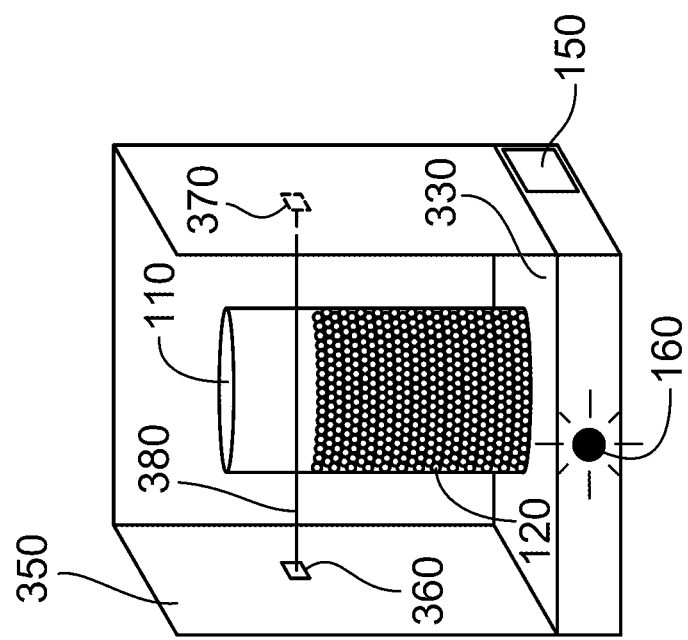
FIG. 3C

SYSTEM FOR AUTOMATICALLY MONITORING A SUPPLY OF A CONSUMABLE PRODUCT, REPLENISHING THE SUPPLY, AND METHODS OF USE

BACKGROUND

Field of the Invention

This invention relates to methods and devices for tracking inventories of consumable supplies and ordering replacement consumable supplies in a timely manner.

Background of the Invention

Homes and businesses rely on supplies of a variety of consumable goods. Keeping track of these consumable goods requires time and attention. Time and money may be lost if a supply of a consumable good is not replaced in a timely manner. In the home, for example, a supple of cooking ingredients or pet food may be overlooked and require an unplanned trip to a retail store. In a manufacturing setting, for example, failing to timely order a supply of a part of the manufactured product may cause production delays which cost the business money and irritate customers.

A system is needed which automatically monitors supplies of consumable goods, alerts the user when the supplies reach a defined minimum level, and reorders the consumable goods to replace that which was consumed.

BRIEF SUMMARY OF THE INVENTION

We disclose a system for automatically tracking an inventory of a consumable good and for automatically submitting an order or request for a replacement supply of the consumable good when the inventory reaches a defined minimum level. The system may include an apparatus that has a container and a sensor which measures the consumable good held in the container. In an example, the sensor is a scale which measures the mass of the consumable good in the container. In another example, the sensor includes a laser and laser detector. In the latter example, the laser may direct a laser beam laterally across the container at a level which is associated with a minimum volume of the consumable good. The laser beam may be blocked from reaching the laser sensor on the opposite side of the container when the consumable good is at a level which blocks the laser beam. When the consumable good is reduced to a level below the laser beam, the laser beam travels through the container and a laser beam detector on the opposite side of the container detects the laser beam.

The apparatus may include an electronic communication connection device which may transmit communications between the system and a server. The server may store non-transitory computer-readable medium which may include instructions for receiving, storing, and acting upon user preferences.

The user preferences may include a minimum amount of a consumable good which, when reached, initiates notifications to alert the user that the minimum amount has been reached and which sends a transmission to a supplier requesting a replacement supply of the consumable good. Additional user preferences may include a frequency at which the sensor collects measurements of the consumable good in the container, preferred and secondary suppliers, billing information, shipping information, and preferred method of sending user notifications.

The apparatus may include a signaling device which provides a notification signal when the consumable good within the container reaches the defined minimum level. The signaling device may be a light on the apparatus, an audio speaker which emits an audible sound, or a screen which displays textual messages. The signaling device may be in electronic communication with the server. In some embodiments, the sensor transmits a measurement to the server and the algorithm within the non-transitory computer-readable medium identifies the measurement as a value that is at or below the defined minimum level. The instructions may then initiate a transmission from the server to the apparatus which actuates the signaling device to generate a signal.

In addition to alerting the user through the signaling device when the defined minimum level is reached, the non-transitory computer-readable medium may include instructions to send a transmission to a supplier requesting a replacement supply of the consumable good. The transmission may include information specified in the user preferences.

In some embodiments, the apparatus may include an automatic dispenser which automatically dispenses an aliquot of the consumable good held in the container according to instructions within the non-transitory computer-readable medium. In some embodiments, the apparatus may include a scale disposed adjacent to the automatic dispenser. The scale may measure the body mass of an animal as the animal approaches the automatic dispenser, transmit the body mass measurement to the server where the non-transitory computer-readable medium may calculate an amount of animal food (the consumable good in this example) to dispense to the animal. The non-transitory computer-readable medium may transmit the calculated amount of animal food to the apparatus which may actuate the automatic dispenser causing it to dispense the animal food.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings.

FIG. 1 illustrates an embodiment of the disclosed system in which the supply of a consumable product is monitored by periodic measurements of the product's mass.

FIG. 2B illustrates the embodiment of FIGS. 1 and 2A in which the supply of the consumable product is below a defined minimum amount.

FIG. 3C illustrates the embodiment of FIGS. 3A and 3B showing an illuminated signal alerting the user that the consumable product is below the defined amount and showing the product being automatically reordered

DETAILED DESCRIPTION OF THE INVENTION

Figure 2A:
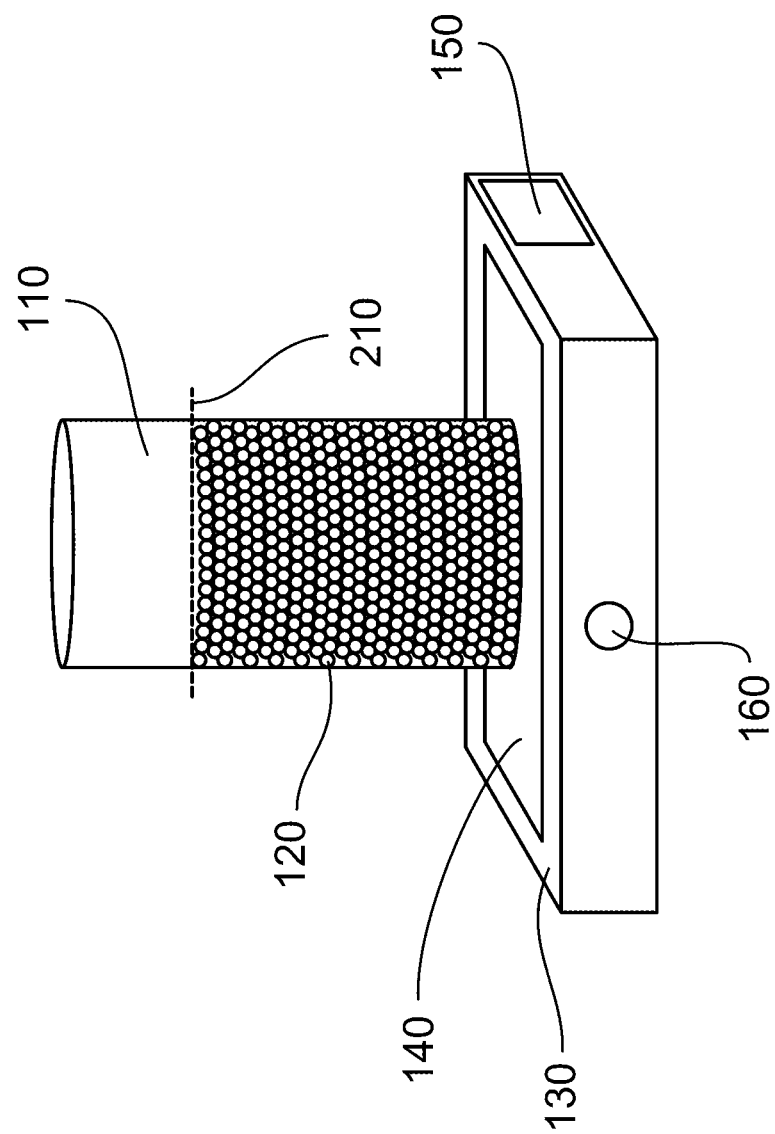
FIG. 2A illustrates the embodiment shown in FIG. 1 in which the supply of the consumable product is above a defined minimum amount.

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

We disclose an innovation which solves the problem of running out of animal food, food staples, production supplies, manufacturing parts, or virtually any consumable good. The disclosed system tracks the inventory of the consumable good which may be stored in a container that is part of an apparatus. The container may be connected to a sensor which measures the amount of consumable good in the container. The system may include an electronic communication connection device through which the sensor measurement is transmitted to a server. The electronic communication connection may include a wireless connection or a wire-based communication. In an example, the server is a cloud database which includes storage for data and non-transitory computer-readable media.

Any sensor which conducts a measurement of the amount of consumable good in the container may be used with this system. In an example, the sensor is a scale which measures the mass of the consumable good in the container. In this embodiment, the container is positioned above the scale and the scale is connected to the electronic communication connection device. The scale may periodically collect mass measurements and the apparatus may transmit the mass measurements to the server through the electronic communication connection device. In another example, the sensor determines when the volume of the consumable good in the container is equal or less than a defined value. For example, a laser may direct a laser beam laterally across the container at a level which is associated with a minimum volume of the consumable good. In this embodiment, the container may be substantially transparent allowing the laser to pass through the container walls. When the container is full, the consumable product blocks the laser beam preventing it from passing through the container. When the volume of consumable good is below this level on the container, the laser beam may pass through the container. A laser beam detector, for example, a spectrometer, may detect the laser beam. The spectrometer may be in electronic communication with the electronic communication connection device which may transmit a communication to the server. The communication may be an indication that the minimum volume of the consumable good has been reached.

The apparatus may include a signaling device. In some embodiments, the signaling device is positioned on the apparatus. The signaling device may emit an illuminated signal, for example a light. In another example, the signaling device includes an audio speaker which may emit an audible alert. The audible alert may be a siren, a beeping noise, or a verbal message. In some embodiments, the apparatus includes a screen which displays textual messages. The signaling device may provide a local alert to a user that the amount consumable good has reached or fallen below a defined minimum amount.

The signaling device may be in electronic connection with the sensor, the server through the electronic communication connection device, or both. Consequently, a sensor measurement at or below the defined amount of consumable good may directly actuate the signaling device. In addition, or in the alternative, the electronic communication connection device may transmit the sensor measurement to the server. The server may store non-transitory computer-readable medium which includes instructions to transmit a signal from the server to the signaling device when the minimum amount of consumable good is detected.

The server may store non-transitory computer-readable medium which executes algorithms which participate in the functioning of the disclosed system. As discussed above, the non-transitory computer-readable medium may include instructions to receive measurements from the sensor and to send a transmission to the signaling device when the measurements reach or fall below a defined value. The non-transitory computer-readable medium may also include instructions to receive, store, and act upon user preferences.

The user preferences may include one or more of the following list: a defined minimum measurement, a defined minimum volume of consumable product, and a frequency at which the sensor collects measurements of the consumable good in the container. In some embodiments, the apparatus includes a timing device which is in electronic communication with the sensor. The timing device may also be in electronic communication with the server. The frequency may be modified in response to changes in user preferences entered into the non-transitory computer-readable media stored on the server. In an example, the timing device may actuate the sensor once weekly, once daily, twice daily, once hourly, or multiple times per second. The user preferences may include a preferred supplier from which the user wishes to obtain a replacement supply of the consumable good as well as a secondary supplier in the event that the preferred supplier is unable to supply the replacement supply. The user preferences may include billing and shipping information to include with the order submitted to the supplier. Product information, for example, a part number, a quantity, or a mass of product the user wishes to obtain from the supplier may be included in the user preferences. The user preferences may also include a preferred method of sending notifications to the user, for example, e-mail, text message, or voicemail recording. The user preferences may be transmitted to the non-transitory computer-readable medium using a variety of mechanisms including a web interface, an application on the user's mobile device, or a keypad on the apparatus.

The non-transitory computer-readable medium may include instructions to send a transmission to a supplier requesting a replacement supply of the consumable good in response to the signal from the sensor reporting a measurement at or below the defined minimum measurement. The contents of the transmission to the supplier may be defined by and include some or all of the user preferences discussed above. The transmission to the supplier may be a wireless or wire-based transmission. The non-transitory computer-readable medium may also include instructions to send a transmission to the user informing the user of the transmission to the supplier. The transmission to the user may include, but is not limited to, one or more of the following: the value of the sensor measurement which triggered the transmission to the supplier, the date the sensor measurement was taken, the date the transmission to the supplier was sent, and the information in the transmission to the supplier. The user may receive the transmission through an e-mail, a short message service message, or a voicemail recording.

In some embodiments the apparatus used in the disclosed system includes an automatic dispenser. The automatic dispenser may be used in situations when a user does not wish to manually remove the consumable good from the container or when the user wishes the system to determine how much of the consumable good should be removed at a given time. In an example, the user may wish to feed an animal, for example, a pet, an amount of food that is proportional to the animal's current mass. Consequently, the system may feed a single animal an amount which may vary over time base on the animal's current body mass. Alternatively, the system may feed multiple animals, each with a different body mass, and provide each animal a different amount of food.

The automatic dispenser may include an orifice in mechanical communication with the interior of the container. In some embodiments, the orifice is disposed in a wall of the container. A cover, for example, a hinged door, may removable cover the orifice keeping the animal food in the container between feedings. The cover may be in electronic communication with the server through the electronic communication connection device. The non-transitory computer-readable medium may include instructions to actuate the cover causing it to open and close according to an algorithm.

In some embodiments, a scale may be placed adjacent to the automatic dispenser. The scale may be in electronic communication with the server through the electronic communication connection device. In an example, an animal may approach the automatic dispenser seeking food and step onto the scale. The scale may measure the animal's body mass and the apparatus may transmit the body mass measurement to the server through the electronic communication connection device. An algorithm within the non-transitory computer-readable medium may determine an amount of food the animal should receive. The algorithm may perform a calculation including the animal's body mass. The server may then send a transmission to the apparatus which the apparatus may receive through the electronic communication connection device. The transmission may cause the cover to be actuated and uncover the orifice. Animal food may then be dispensed through the orifice. In an example, the animal food exits the apparatus through the orifice in response to gravitational forces.

The amount of animal food dispensed at a given time may be detected through sensor readings as described herein. For example, the sensor may comprise a scale beneath the container which may take continuous mass measurements as the animal food exits the apparatus. The apparatus may transmit the measurements to the server. The non-transitory computer-readable media may include instructions to send a transmission to the apparatus when the mass of the animal food in the container has been reduced by an amount that corresponds to the calculated amount of food for the animal. The transmission to the apparatus may signal the cover to return to its closed position covering the orifice.

Referring now to the drawings, FIG. 1 illustrates apparatus 100, an embodiment of the disclosed system, in which container 110 holds an amount of consumable good 120. Container 110 is positioned on platform 130 which includes scale 140. Scale 140 periodically measures the mass of consumable good 120. These mass measurements are transmitted to a server using electronic communication connection device 150 which connects the apparatus to a server. Electronic communication connection device 150 may work wirelessly or through electrical wiring. Illumination signal 160 is actuated when the mass of consumable good 120 falls below a defined level.

Figure 2C:
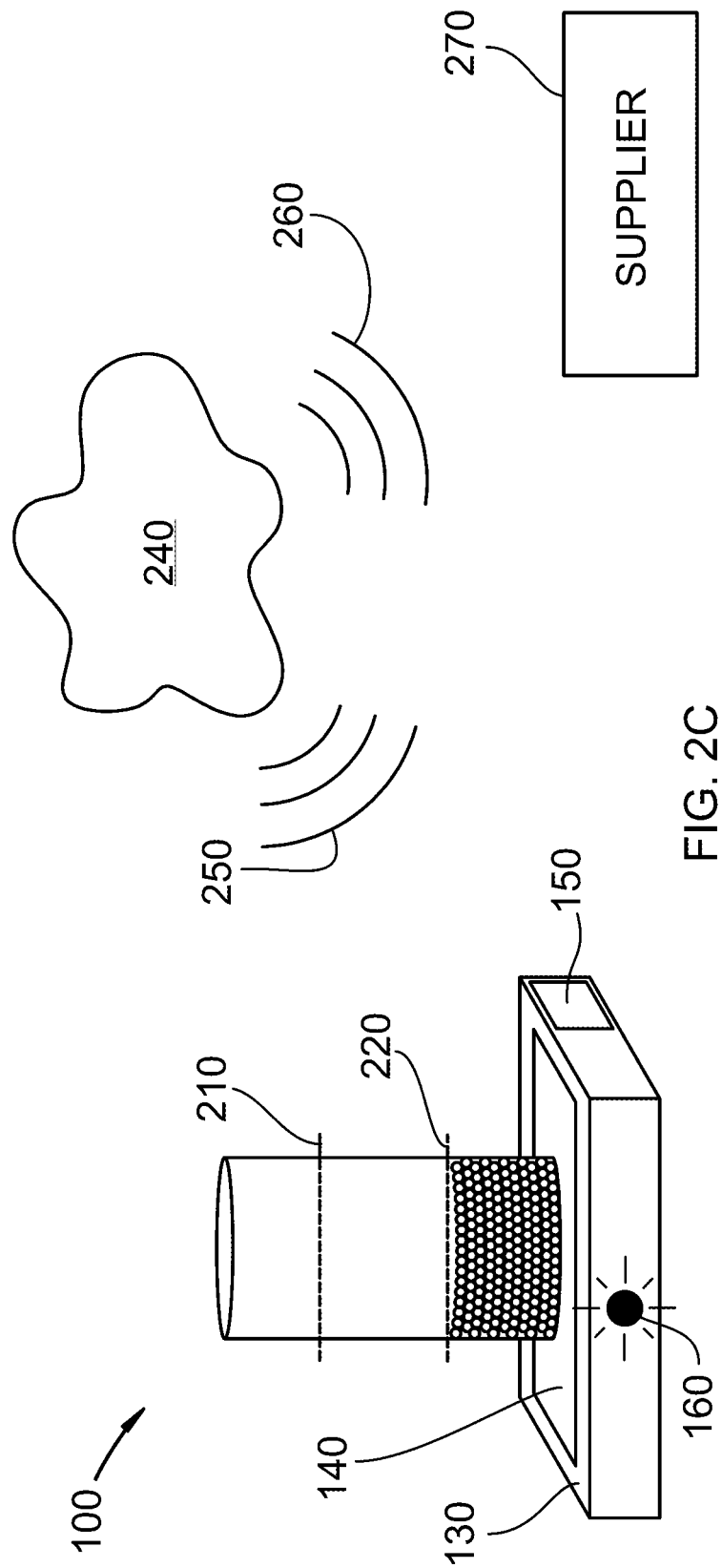
FIG. 2C illustrates the embodiment shown in FIG. 2B showing an illuminated signal alerting the user that the amount of consumable product is below the defined amount and showing the product being automatically reordered.

FIGS. 2A-2C illustrate the embodiment of FIG. 1 in use. In FIG. 2A, the amount of consumable good 120 in container 110 is at level 210. This is above a minimum amount the user has designated as an indication that a replacement supply of consumable good 120 should be ordered from a supplier.

In FIG. 2B, consumable good 120 has fallen to level 220. In this embodiment, the user has defined level 220 as the amount which is the trigger for reordering a supply of consumable good 120. Also in this embodiment, the disclosed system identifies level 220 by measuring a mass known to correspond to level 220 using scale 140. The periodic mass measurements are sent to cloud database 240 through wireless signal 230.

In FIG. 2C, software stored in the cloud database has received wireless signal 230 and identified it as an indicator that the mass measurement has reached level 220 or below. The software then causes wireless signal 250 to be sent to apparatus 100 which signals apparatus 100 to actuate illumination signal 160. The user may observe that illumination signal 160 now emits light which may alert the user that level 220 or below has been reached. In addition, wireless signal 260 transmits an order to supplier 270 requesting that a replacement supply of consumable good 120 be shipped to the user.

Figure 3A:
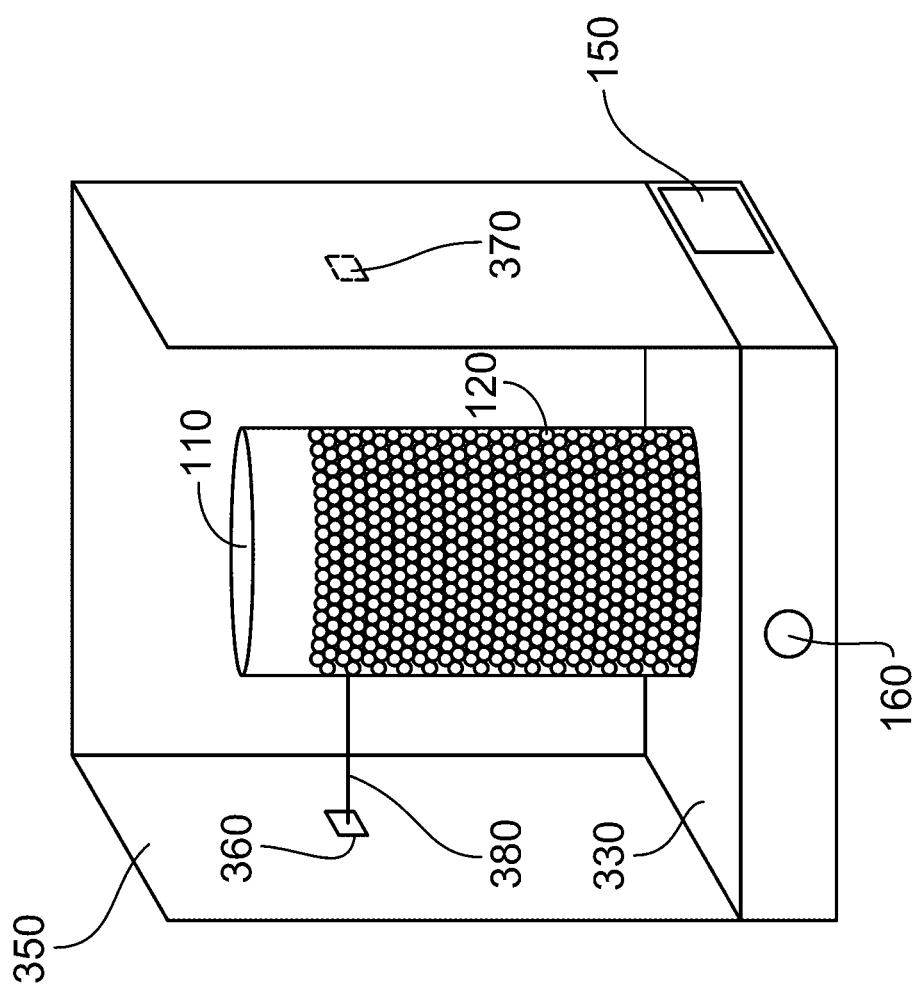
FIG. 3A illustrates another embodiment of the disclosed system in which a laser beam is prevented from traveling through the container when a defined minimum supply of a consumable product is present in the container.
Figure 3B:
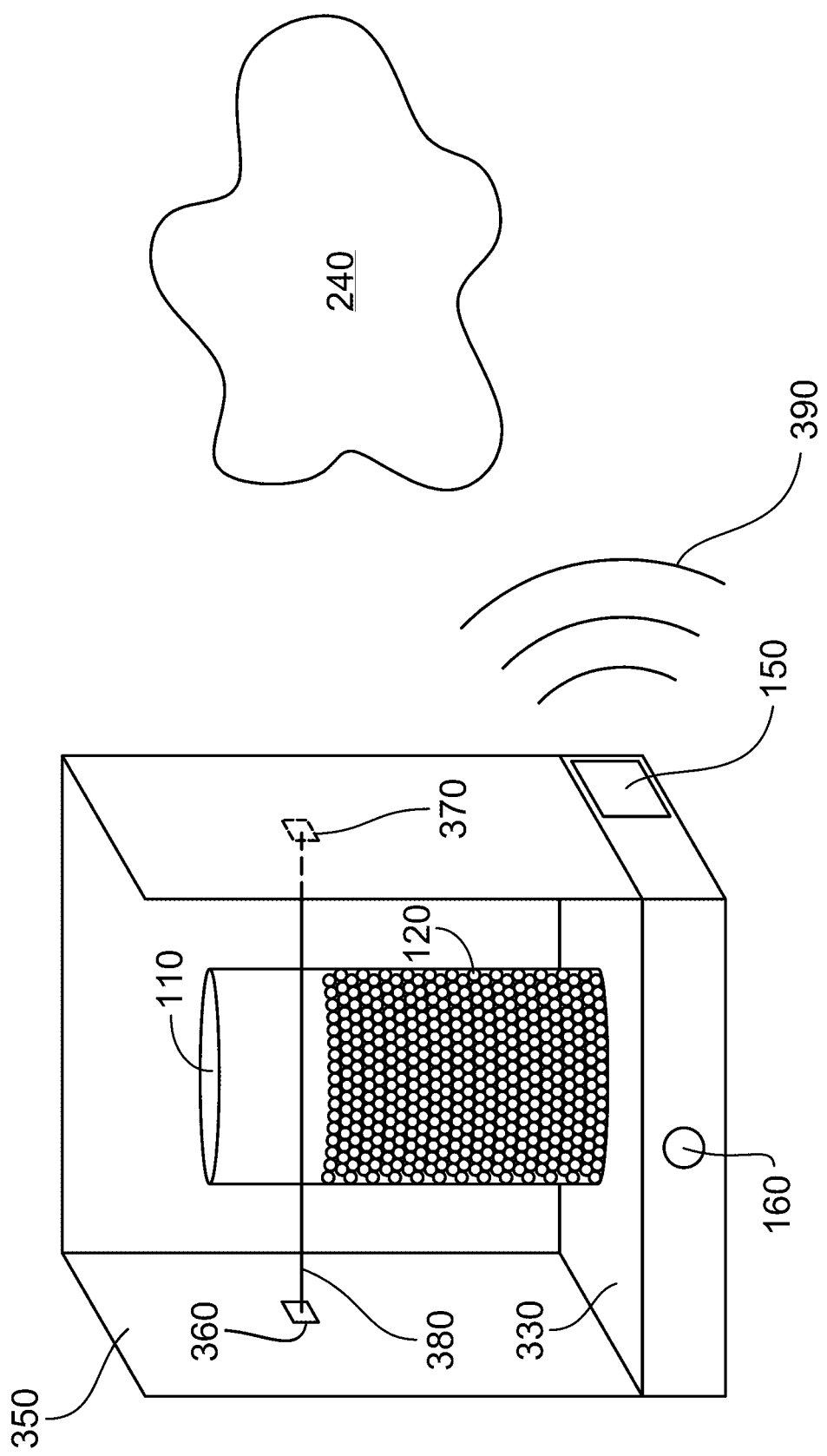
FIG. 3B illustrates the embodiment of FIG. 3A in which the laser beam travels through the container after the volume of the consumable product falls below a defined level.

FIGS. 3A-3B illustrate another embodiment of the disclosed system in which a height of consumable good 120 in container 110 is used to indicate when the amount of consumable good 120 has fallen below a defined level. In FIG. 3A, container 110 is positioned above platform 330. Enclosure 350 surrounds container 110. Laser 360 emits laser beam 380 toward container 110. Consumable good 120 blocks laser beam 380 preventing the light from laser beam 380 from being transmitted through container 110. Consequently, laser beam detector 370, on the opposite side of enclosure 350 relative to laser 360, does not detect laser beam 380. In some embodiments, the laser and the laser beam detector are each mounted on a vertical track so that the heights of laser and the laser beam detector may be adjusted in response to changing defined minimum values of consumable good.

FIG. 3B shows a reduced amount of consumable good 120 in container 110 relative to that shown in FIG. 3A. Consumable good 120 no longer blocks laser beam 380. Rather, laser beam 380 now travels through container 110 and laser beam detector 370 detects laser beam 380. Laser beam detector 370 is in electronic connection with electronic communication connection device 150 and sends an electronic signal to electronic communication connection device 150 indicating that laser beam detector 370 has detected laser beam 380. Wireless signal 390 is transmitted from electronic communication connection device 150 to cloud database 240. Software stored in cloud database 240 responds to wireless signal 390 by sending wireless signal 250 and wireless signal 260. Electronic communication connection device 150 receives signal 250 which triggers the actuation of illumination signal 160. As in previously disclosed embodiments, the user may observe that illumination signal 160 emits light which may alert the user that the designated minimum level of consumable good 120 has been reached. Wireless signal 260 transmits an order to supplier 270 requesting that a replacement supply of consumable good 120 be shipped to the user.

Figure 4A:
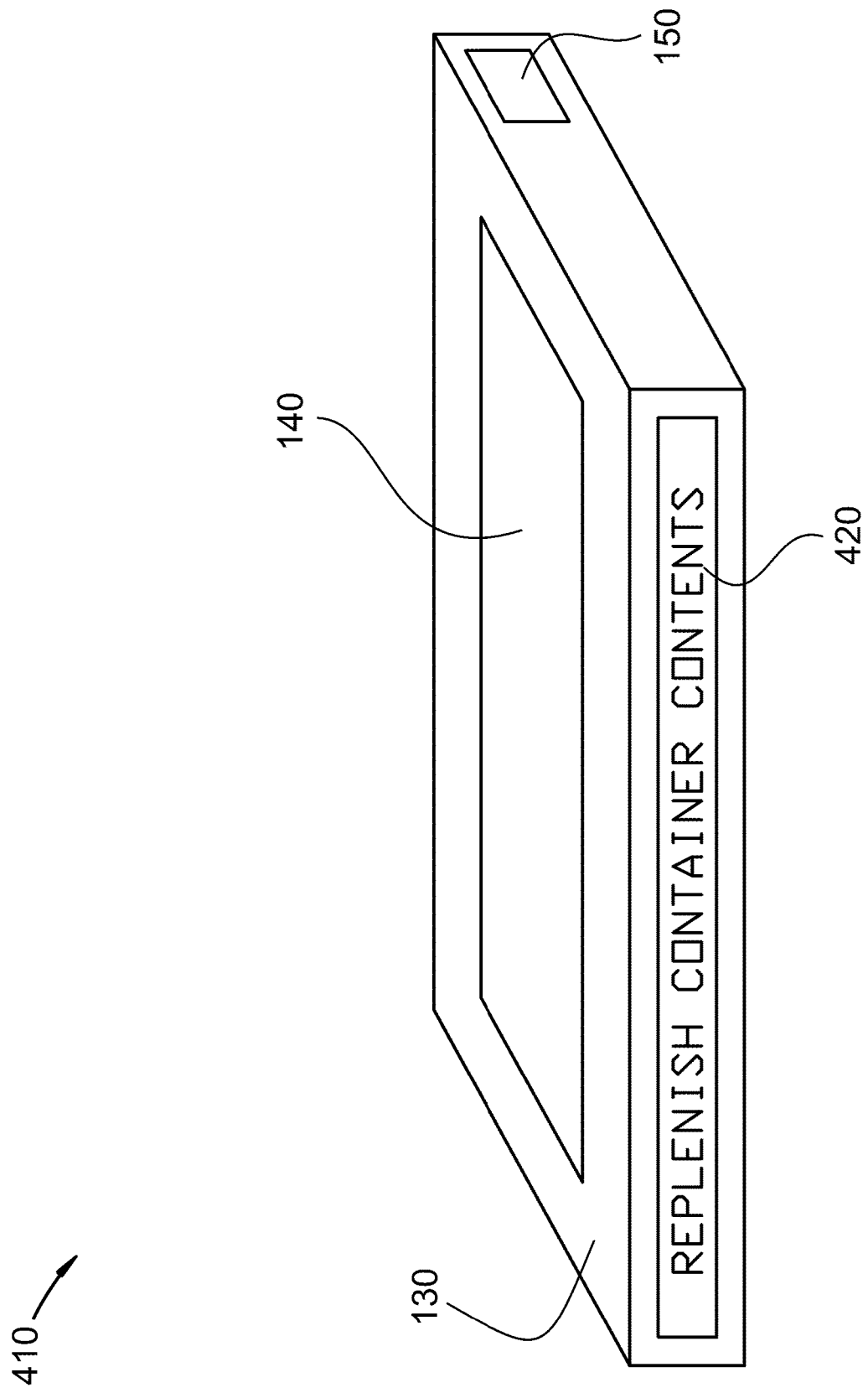
FIG. 4A illustrates a portion of an embodiment of the disclosed system in which the signaling device alerts the user by producing a textual message on a screen.

FIGS. 4A-4D illustrate other embodiments of signals which, similar to illumination signal 160 shown in previous drawings, may alert a user that a consumable product has reached or fallen below a defined minimum amount. FIG. 4A shows device 410 which resembles device 100 of FIG. 1. In place of illumination signal 160 of device 100, device 410 includes screen 420 which provides textual messages. The textual messages may provide information to the user including information as to the status of the inventory of a consumable product.

Figure 4B:
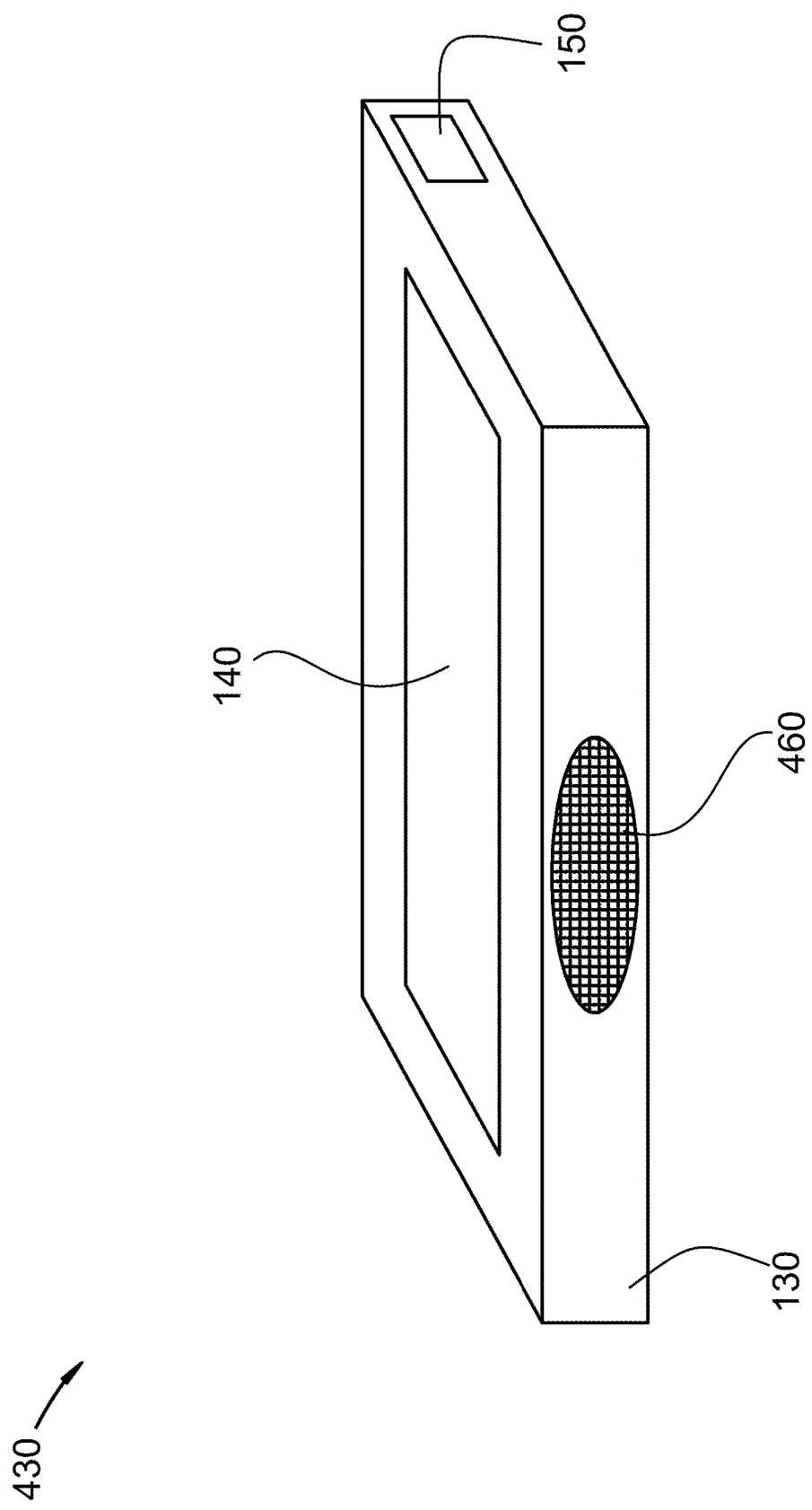
FIG. 4B illustrates a portion of an embodiment of the disclosed system in which the signaling device alerts the user by producing an audible signal emitted by an audio speaker.

FIG. 4B illustrates device 430 which also includes platform 130 as shown in FIG. 1. In place of illumination signal 160 of device 100, device 430 includes speaker 460 which may emit an audible sound to provide information to the user. This information may include the status of the inventory of a consumable product. The audible sound may be verbal or simply a siren or beeping sound.

Figure 4C:
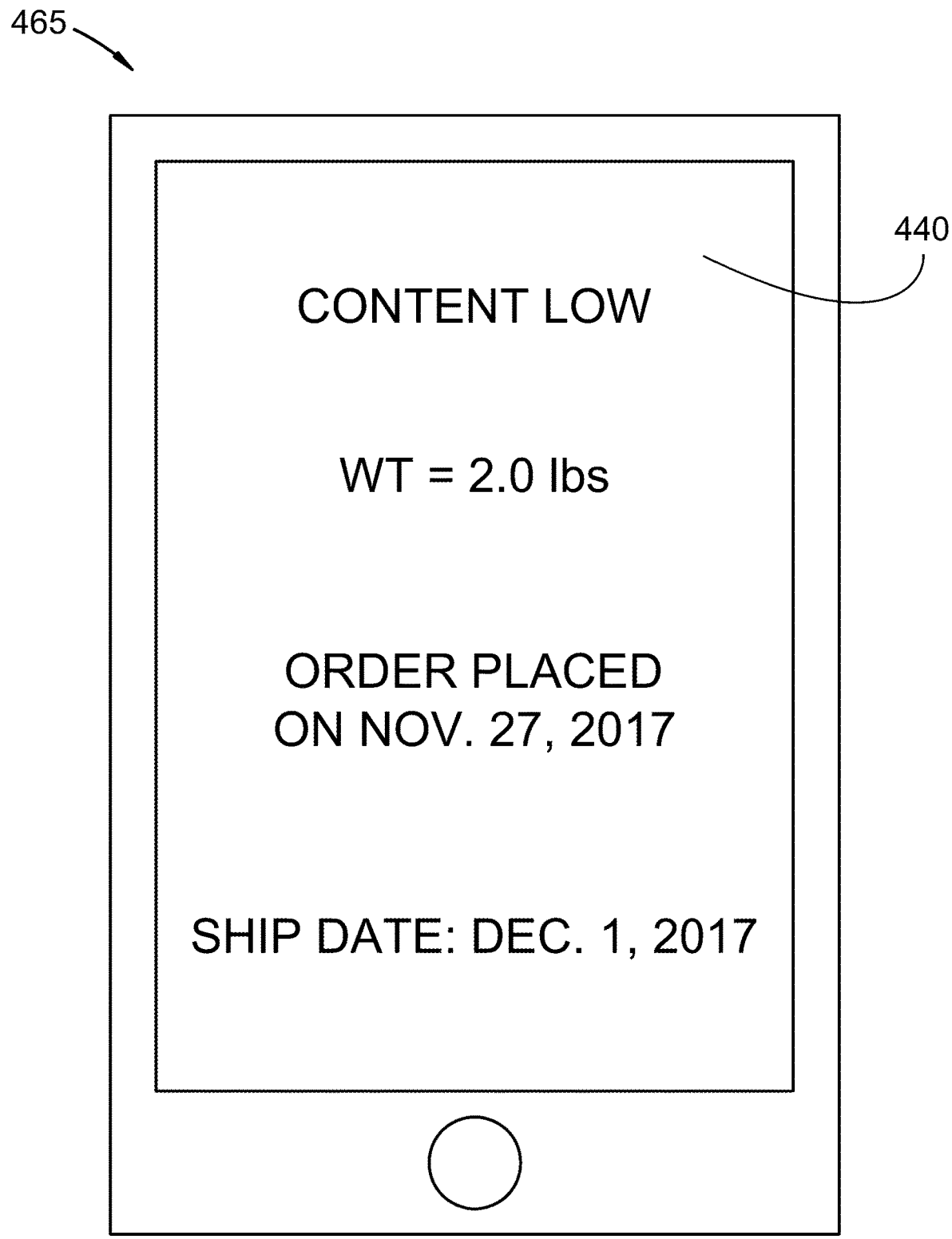
FIG. 4C illustrates a portion of an embodiment of the disclosed system in which the signaling device alerts the user by sending a text message to the user's mobile device.

FIG. 4C illustrates mobile device 465 which may belong to the user of the disclosed system. Screen 440 of mobile device 465 illustrates a short message service message which informs the user that the content of the consumable product is low, the mass of the remaining inventory of the consumable product, the date a replacement order was automatically placed by an embodiment of the disclosed system, and the date the supplier has indicated the replacement order will be shipped.

Figure 4D:
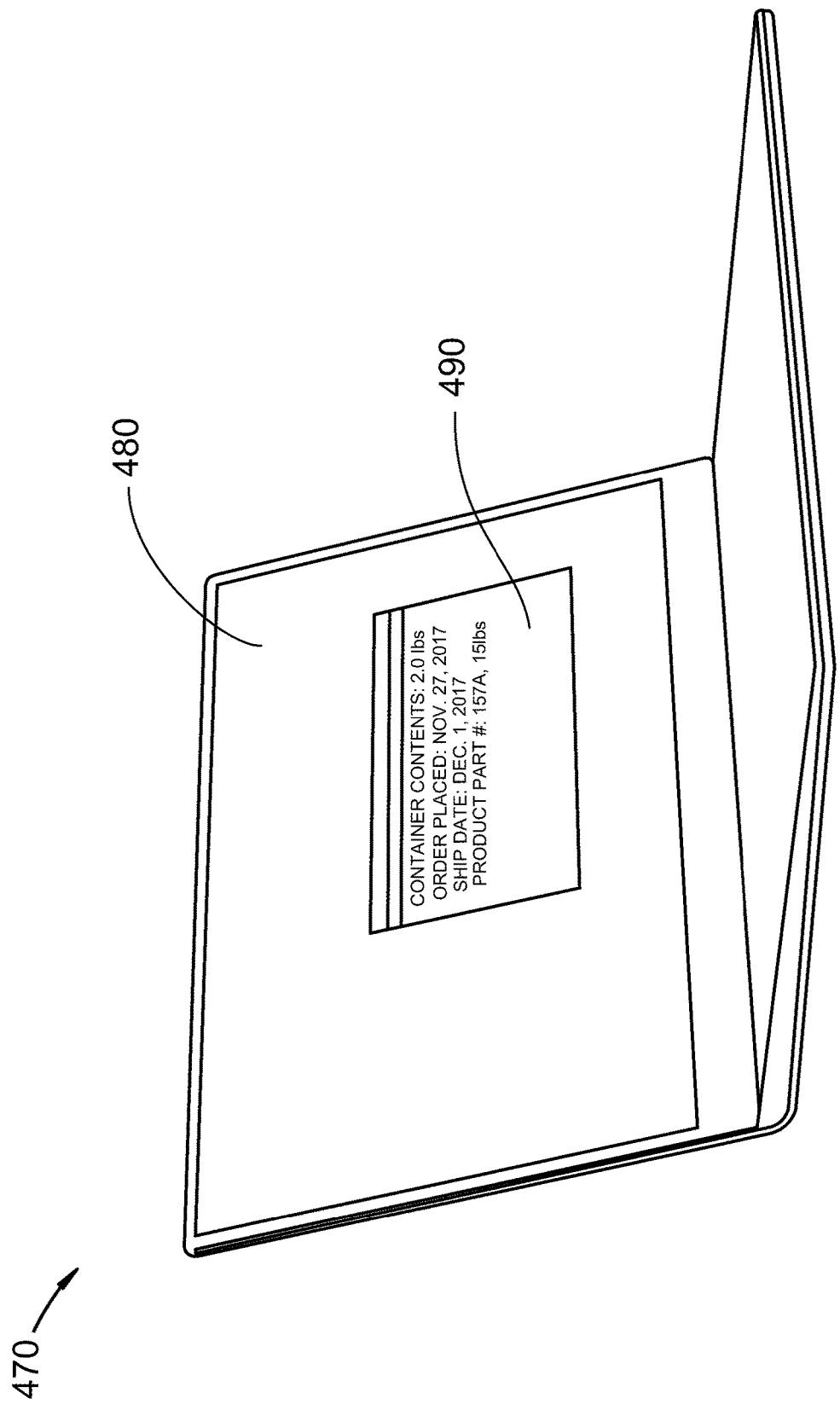
FIG. 4D illustrates a portion of an embodiment of the disclosed system in which the signaling device alerts the user by sending an e-mail to the user.

FIG. 4D illustrates computer 470 which may belong to the user. Screen 480 of computer 470 displays e-mail 490 which an embodiment of the disclosed system has transmitted to the user. E-mail 490 communicates that the current mass of the consumable product is 2.0 lbs., that an embodiment of the disclosed system ordered placed a replacement order on Nov. 27, 2017, that the supplier has indicated the replacement order will be shipped on Dec. 1, 2017, that the part number for the consumable good in the replacement order is 157A, and that part number 157A comprises 15 lbs. of consumable good.

Figure 5:
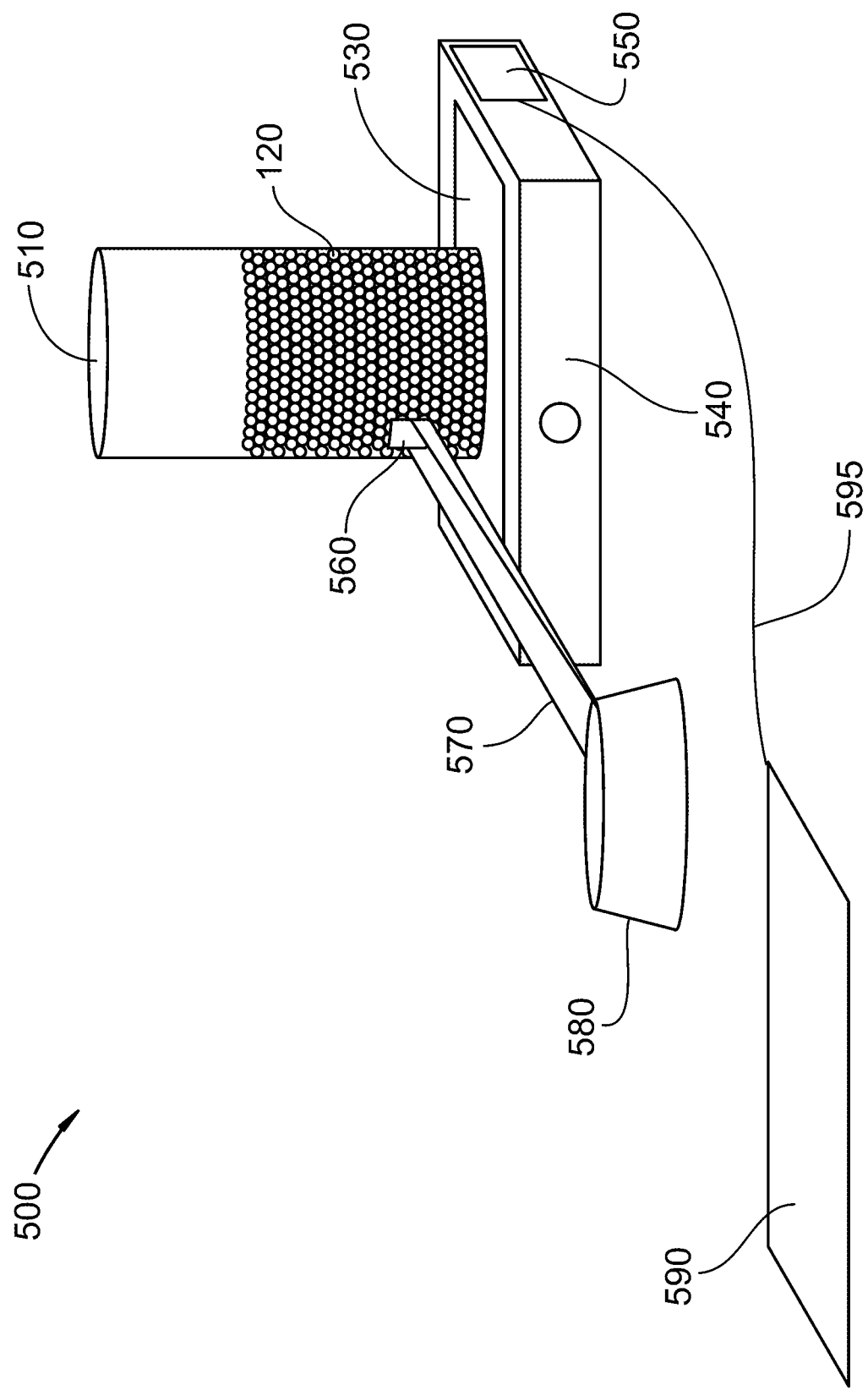
FIG. 5 illustrates an embodiment of the disclosed system which includes an automatic dispenser and a floor scale.

FIG. 5 illustrates apparatus 500 which is yet another embodiment of the disclosed system. Apparatus 500 provides animal food to an animal according to the current mass of the animal being fed. Apparatus 500 includes container 510 which is positioned on scale 530. Similar to the embodiment shown in FIG. 1, scale 530 is disposed on platform 540. Electronic communication connection device 550 sends and receives signals as does electronic communication connection device 150 described in other embodiments disclosed herein. Automatic dispenser 560 is positioned on container 510. In apparatus 500, automatic dispenser 560 includes a door with a hinge which may open and close in response to signals from software stored on a cloud database. Automatic dispenser 560 further includes an orifice which is in mechanical connection with container 510. The orifice is not shown because it is behind the door. Automatic dispenser 560 is in mechanical connection with slide 570. Slide 570 is also in mechanical connection with feed bowl 580. Thus, when the door of automatic dispenser 560 opens, consumable good 120 exits through the orifice in response to gravitational force. Consumable good 120 slides down slide 570 into food bowl 580, also in response to gravitational force.

Floor scale 590 is positioned adjacent to food bowl 580. An animal wishing to be fed may approach food bowl 580 and, in doing so, stand on floor scale 590. Floor scale 590 measures the current mass of the animal and transmits the measurement through communication wire 595. Communication wire is in electrical connection with electronic communication connection device 550 which transmits a signal comprising the mass of the animal to a server. Software stored on the server may calculate the mass of animal food the animal should receive based on the transmitted mass of the animal, and, in some embodiments, the animal's nutritional needs. The software may then send a signal back to apparatus 500 through electronic communication connection device 550. The door of automatic dispenser 560 may be actuated using electrical and mechanical means known in the art. Scale 530 may perform repeated measurements of consumable good 120 (animal food). When the mass of consumable good 120 has been reduced by the calculated mass of animal food the animal should receive, a signal is sent to the door of automatic dispenser 560 cause it to close. The animal food slides down slide 570 into food bowl 580.

Apparatus 500 also monitors the supply of consumer good 120. Apparatus 500 may transmit an order for additional supply of consumable good 120 when the mass of consumable good 120 is equal to or less than a defined level. In some embodiments, the measurement may be performed using a mechanism as described in FIGS. 2A-2C.

Figure 6:
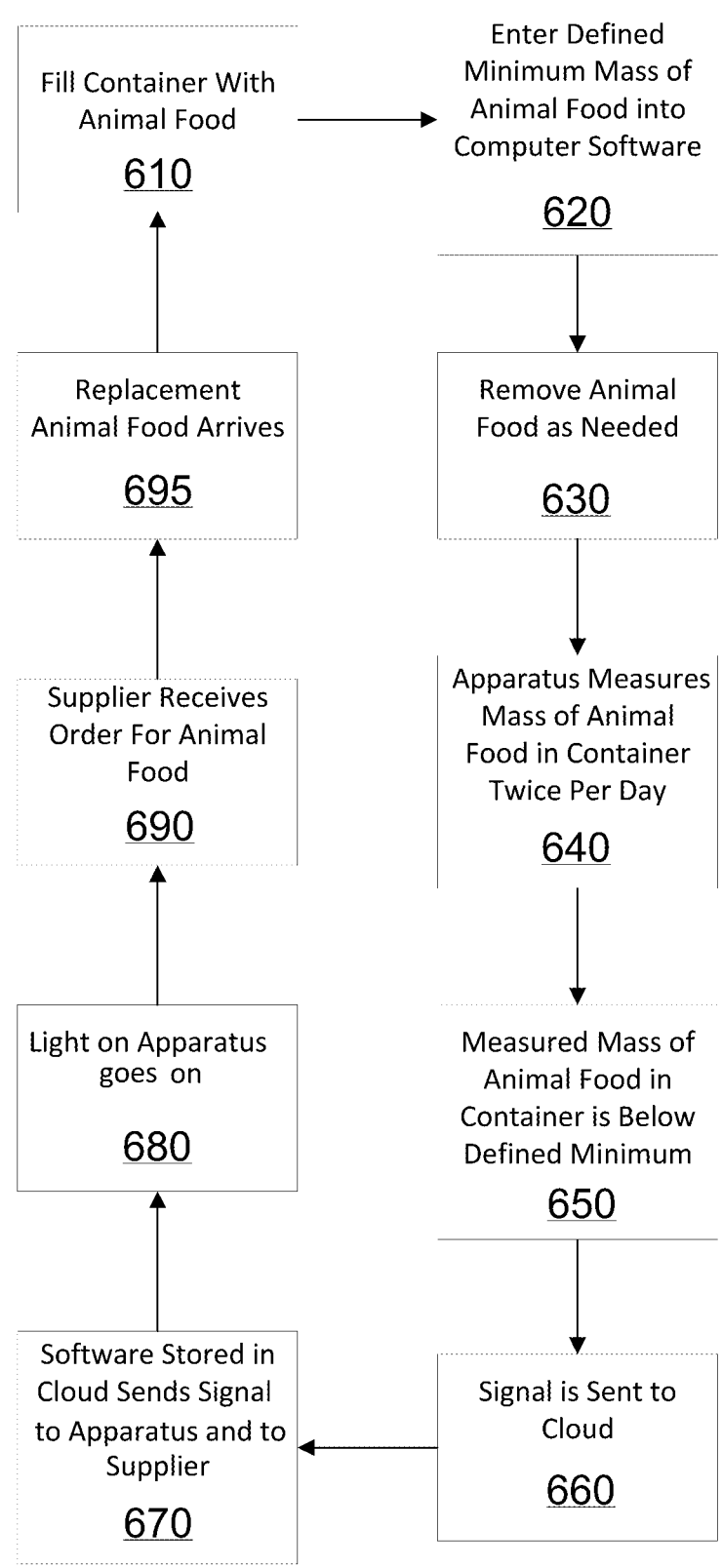
FIG. 6 illustrates a flow chart showing steps taken in an embodiment of a method of using the disclosed system.

FIG. 6 illustrates a flow chart which describes steps which an embodiment of the disclosed system and a user may employ to track a supply of animal food and automatically submit an order to a supplier for a replacement supply of the animal food when it is reduced to a defined level. In step 610, a user fills a container, which is part of an embodiment of the disclosed system, with animal food. The user enters a defined minimum mass of animal food into computer software which may be stored in a cloud database (step 620). The software may include a user interface to simplify step 620. This defined minimum mass is that which the user has chosen to trigger an order of a replacement supply of animal food and which was entered into the computer software as a user preference. Over time, the user removes aliquots of animal food as needed to feed an animal (step 630). In some embodiments, the user may remove the aliquots of animal food manually. In other embodiments, an embodiment of the disclosed system is illustrated in FIG. 5 may automatically remove aliquots of animal food. In the embodiment of FIG. 6, the apparatus measures the mass of the animal food in the container twice per day (step 640) according to user preferences. In step 650, the scale of the apparatus measures a mass of animal food in the container that is below the defined minimum mass. In step 660, the apparatus sends a signal to the server stored on the cloud database communicating the mass measurement of step 650. Software stored in the cloud database identifies that the mass measurement of step 650 is equal to or below the defined minimum mass. In step 670, algorithms in the software then cause a signal to be sent to the apparatus and a signal to an animal food supplier. In step 680, the signal sent to the apparatus actuates a light on the apparatus which may inform the user that the minimum mass of animal food has been reached. In step 690 the signal to the supplier transmits an order for animal food to replace that which was consumed prior to step 650. Note that steps 680 and 690 may occur in reverse order or simultaneously. The supplier then fills the order received in step 690 and the replacement animal food arrives (step 695). The user then repeats step 610 by filling the container with animal food, this time using animal food from the replacement animal food.

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

We claim:

1. An apparatus for tracking and replenishing a supply of a consumable good, comprising:
   a container that contains a supply of a consumable good;
   a sensor, wherein the sensor is coupled to with container;
   an electronic communication device, wherein the electronic communication device is communicatively coupled to the sensor, and wherein the electronic communication device receives a first signal indicating that the supply of the consumable good is at a predetermined level from the sensor and transmits a second signal to a server indicating that the supply of the consumable good is at the predetermined level in response to receiving the first signal; and
   a signaling device, wherein the signaling device is communicatively coupled to the electronic communication device, and wherein the signaling device receives a third signal from the server and actuates an indicator based on the third signal.

2. The apparatus of claim 1, wherein the sensor comprises a scale.

3. The apparatus of claim 1, wherein the sensor comprises a laser and a laser beam detector, wherein the laser is disposed adjacent to the container and directs a laser beam through the container toward the laser beam detector.

4. The apparatus of claim 1, wherein the server transmits a communication to a supplier based on the second signal, and wherein the communication to the supplier comprises a request that the supplier provide a replacement good.

5. The apparatus of claim 4, wherein the server maintains user preferences, and wherein the user preferences comprise one or more of the following: a preferred supplier, a secondary supplier, a description of the replacement good, a requested amount of the replacement good, shipping information, and billing information.

6. The apparatus of claim 1, wherein the sensor comprises a timing device, wherein the timing device triggers sensor readings at a frequency of between once per week and multiple times per second thereby causing the sensor to perform measurements at the frequency.

7. The apparatus of claim 1, wherein the server transmits at least one of an e-mail, a short message service message, or a voicemail recording.

8. The apparatus of claim 1, wherein the signaling device comprises a light.

9. The apparatus of claim 1, wherein the signaling device comprises a screen that displays a textual message.

10. The apparatus of claim 1, wherein the signaling device comprises an audio speaker.

11. The apparatus of claim 1, further comprising an automatic dispenser,
    wherein the automatic dispenser comprises an orifice in communication with an interior of the container; and
    a cover;
    wherein the cover removably covers the orifice, and wherein the cover is in electronic communication with the electronic communication device.

12. The apparatus of claim 11, further comprising a scale, wherein the scale is disposed adjacent to the automatic dispenser, and wherein the scale is in electronic communication with the electronic communication device.

13. The apparatus of claim 12, wherein the server calculates an amount of the consumable good to be dispensed from the container through the automatic dispenser, wherein the amount of the consumable good to be dispensed is a function of a measurement collected by the scale, wherein the server actuates the cover to expose the orifice until the amount of the consumable good to be dispensed has passed through the orifice.

14. A method of tracking and replenishing a supply of a consumable good comprising the steps of:
    containing a supply of a consumable good in a container;
    receiving a first signal from a first sensor at an electronic communication device, wherein the first signal indicates that the supply of the consumable good is at a predetermined level;
    transmitting a second signal to a server via the electronic communication device, wherein the second signal indicates that the supply of the consumable good is at the predetermined level;
    receiving a third signal from the server at the electronic communication device; and
    actuating an indicator of a signaling device based on the third signal.

15. The method of claim 14, wherein third signal indicates that the sensor detects the predetermined level.

16. The method of claim 14, further comprising transmitting a request to a supplier through the electronic communication device to provide a replacement good when the sensor detects the predetermined level.

17. The method of claim 14, wherein the consumable good comprises animal feed.

18. The method of claim 14, wherein the sensor comprises a scale.

* * * * *